United States Patent
Meijer et al.

(10) Patent No.: US 7,958,489 B2
(45) Date of Patent: Jun. 7, 2011

(54) OUT OF BAND DATA AUGMENTATION

(75) Inventors: Henricus Johannes Maria Meijer, Mercer Island, WA (US); Jeffrey van Gogh, Redmond, WA (US); Bruno S. Bozza, Redmond, WA (US); Brian C. Beckman, Newcastle, WA (US); Wei Zhu, Sammamish, WA (US); Michael Barnett, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 11/734,669

(22) Filed: Apr. 12, 2007

(65) Prior Publication Data

US 2008/0256512 A1     Oct. 16, 2008

(51) Int. Cl.
*G06F 9/44*     (2006.01)

(52) U.S. Cl. .................................. 717/110; 717/114

(58) Field of Classification Search .................. 717/110, 717/106, 114; 707/2
See application file for complete search history.

(56) References Cited

U.S. PATENT DOCUMENTS

| | | | |
|---|---|---|---|
| 5,845,118 | A | 12/1998 | Gheith |
| 6,023,715 | A * | 2/2000 | Burkes et al. ............... 715/207 |
| 6,349,343 | B1 | 2/2002 | Foody et al. |
| 6,549,906 | B1 * | 4/2003 | Austin et al. .......................... 1/1 |
| 7,093,088 | B1 * | 8/2006 | Todd et al. ................... 711/162 |
| 7,120,897 | B2 | 10/2006 | Ebbo et al. |
| 7,155,703 | B2 | 12/2006 | Meijer et al. |
| 2001/0044811 | A1 * | 11/2001 | Ballantyne et al. ........... 707/513 |
| 2003/0051234 | A1 | 3/2003 | Schmidt |
| 2003/0154468 | A1 | 8/2003 | Gordon et al. |
| 2004/0083467 | A1 | 4/2004 | Hanley et al. |
| 2005/0198624 | A1 | 9/2005 | Chipman |
| 2006/0190934 | A1 | 8/2006 | Kielstra et al. |
| 2007/0028210 | A1 | 2/2007 | Meijer et al. |
| 2007/0042790 | A1 * | 2/2007 | Mohi et al. ................. 455/456.5 |
| 2007/0226715 | A1 * | 9/2007 | Kimura et al. ................ 717/148 |
| 2007/0250470 | A1 * | 10/2007 | Duffy et al. ........................ 707/2 |
| 2008/0235231 | A1 * | 9/2008 | Gass et al. ........................ 707/9 |
| 2008/0243891 | A1 * | 10/2008 | Super et al. .................... 707/101 |

OTHER PUBLICATIONS

Van Dyk et al., "The Art of Data Augmentation", 2001 American Statistical Association, Journal of Computational and Graphical Statistics, vol. 10, No. 1, pp. 1-50.*
Loitsch, et al. "Compiling Scheme to JavaScript", Apr. 7, 2006, http://www-sop.inria.fr/mimosa/personnel/Florian.Loitsch/scheme2js/files/article.pdf, last accessed Feb. 2, 2007, 10 pages.
Benton, et al. "Compiling Standard ML to Java Bytecodes", 3rd ACM SIGPLAN Conference on Functional Programming, Sep. 1998, last accessed Feb. 22, 2007,13 pages, Baltimore, MD.
Gary, et al. "Modern Languages and Microsoft's Component Object Model", Communications of the ACM, http://delivery.acm.org/10.1145/280000/274957/p55-gray.pdf?key1=274957&key2=2956302711&coll=GUIDE&dl=GUIDE&CFID=11772195&CFTOKEN=32265815, May 1998, vol. 41, No. 5, last accessed Feb. 22, 2007, 11 pages. SYME. "Leveraging .NET Meta-programming Components from F# Integrated Queries and Interoperable Heterogeneous Execution" http://delivery.acm.org/10.1145/1160000/1159884/p43-syme.pdf?key1=1159884&key2=5038302711&coll=GUIDE&dl=GUIDE&CFID=11773884&CFTOKEN=48847939, last accessed Feb. 22, 2007, 12 pages.

* cited by examiner

*Primary Examiner* — Wei Y Zhen
*Assistant Examiner* — Chih-Ching Chow
(74) *Attorney, Agent, or Firm* — Workman Nydegger

(57) ABSTRACT

Systems and methods facilitate data augmentation in a computer environment. Data collections of various forms are altered out of band with at least one augmentor specifying alterations thereto. The alterations are applied to an associated collection of data such as programmatic code. In this manner, data can be modified, extended and/or removed from the collection to enable specialization and/or personalization, among other things.

18 Claims, 10 Drawing Sheets

OUT OF BAND DATA AUGMENTATION

BACKGROUND

Computer programs are groups of instructions that describe actions to be performed by a computer or other processor-based device. When a computer program is loaded and executed on computer hardware, the computer will behave in a predetermined manner by following the instructions of the computer program. Accordingly, the computer becomes a specialized machine that performs the tasks prescribed by the instructions.

A programmer using one or more programming languages creates the instructions comprising a computer program. Typically, source code is specified or edited by a programmer manually and/or with help of an integrated development environment (IDE). Subsequently, the source code can be compiled or otherwise transformed by another program into computer instructions executable by a computer or like device.

By way of example, a programmer may choose to implemented code utilizing an object-oriented programming language (e.g., C#, Java . . . ). In accordance with such a paradigm, programmers will create a number of classes identifying properties and characteristics of an abstract thing as well as methods describing class behavior or abilities. Specific programmatic logic can then be specified as interactions between instances of classes or objects, among other things. Subsequently, executable code for a particular machine can be produced by an associated compiler. Alternatively, code can be transformed into intermediate code for a target virtual machine to facilitate execution on multiple computer platforms via further compilation or interpretation of the intermediate code.

In some instances, it is desirable to modify a computer program or byproduct thereof. For example, a program may be augmented to provide specialized functionality and/or fix a security vulnerability. Alternatively, users may desire to modify a document to add content and/or correct problems. Conventionally, augmentations are made directly to a collection of data. By way of example, a source code program can be modified by adding logging functionality surrounding particular methods. Additionally or alternatively, a single word processing document can be directly edited by multiple users to facilitate collaborative workflow.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, this disclosure pertains to out of band data augmentation. In some instances, it is not possible and/or desirable to augment original data directly. As an alternative, data of various forms (e.g., documents, programmatic code . . . ) can be augmented, modified or otherwise altered via external change specification. Alterations can be embodied in one or more separate constructs associated with the data. Accordingly, data can be represented or interpreted as an amalgamation of original data and zero or more out of band augmentations associated with the original data.

In accordance with an aspect of the disclosure, a system is provided to enable data augmentation via one or more augmentor constructs. The system acquires an augmentee and one or more linked augmentors specifying changes thereto. The one or more augmentors are then applied to the augmentee to generate an augmented result.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are provided for augmenting data out of band. Rather than augmenting data directly, changes can be specified separate from the data to be changed and subsequently applied thereto. Further, the augmentation mechanism can be compositional in nature such that a plurality of augmentations can be applied to linked data. Although such functionality can be applied to any collection of data, in accordance with one embodiment the functionality is provided with respect to computer programs or programmatic code.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
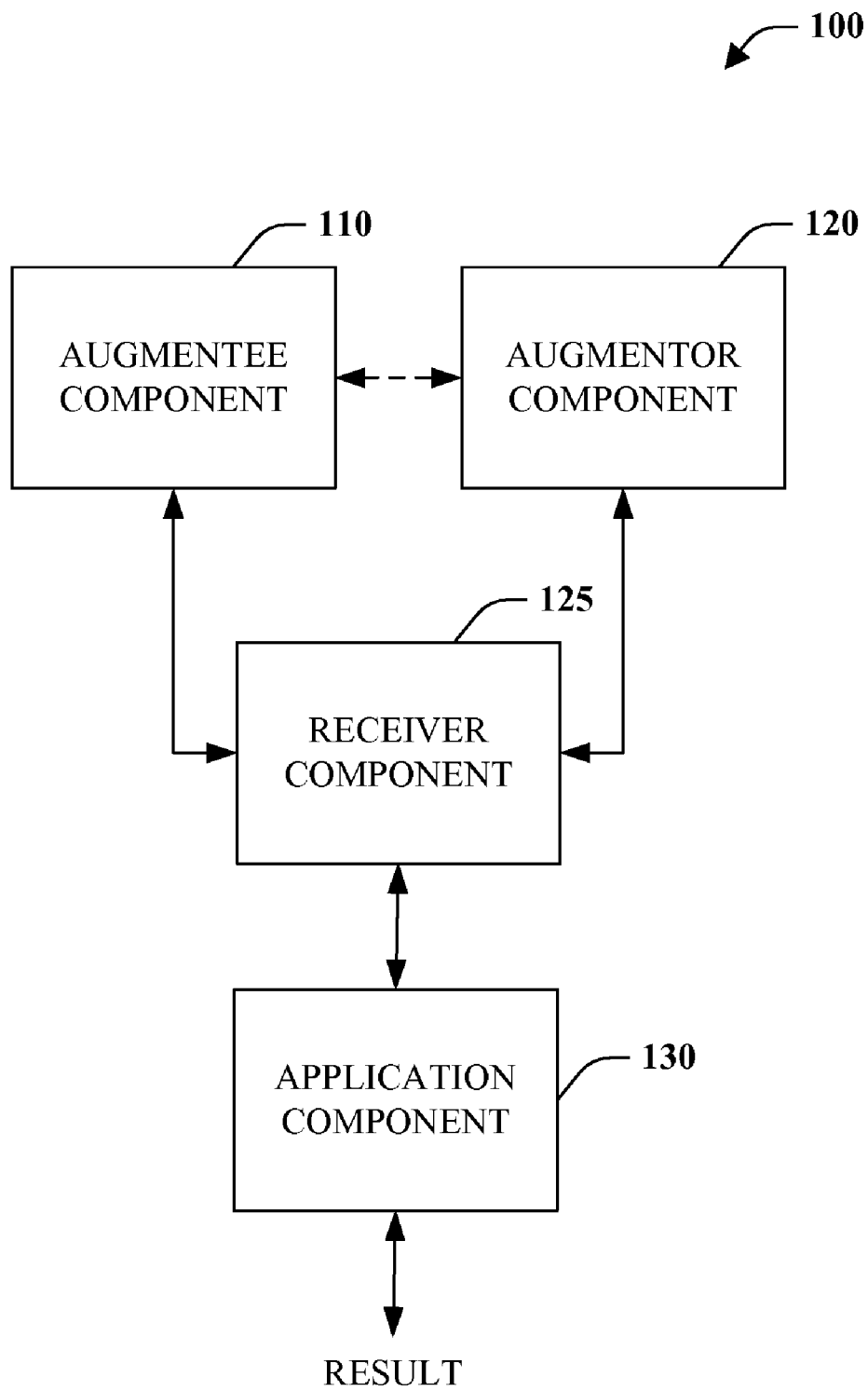
FIG. 1 is a block diagram of a data augmentation system.

Referring initially to FIG. 1, a data augmentation system 100 is illustrated in accordance with an aspect of this disclosure. Data augmentation can comprise altering, removing and/or adding data. The data augmentation system 100 facilitates altering data out of band. In other words, data changes can be initially specified separate or external from data to be changed.

The data augmentation system 100 includes an augmentee component 110 and an augmentor component 120 (also referred to herein as simply augmentee and augmentor). The augmentee component 110 is a component or element that is subject to augmentation. The augmentee component 110 can correspond to any collection of data such as a document or programmatic code, among other things. The augmentor component 120 specifies one or more additions, deletions or other changes to be made to an associated augmentee component 110. More specifically, the augmentor component 120 need only specify changes as opposed to a copy of the augmentee with changes therein, for example. In accordance with one aspect, the augmentee component 110 and the augmentor component 120 can be of the same programmatic structure, form or format (e.g., assembly). Furthermore and as will be described further infra, more than one augmentor component 120 can be associated with a single augmentee component 110, and augmentor components 120 can be associated with more than one augmentee component 110.

Receiver component 125 receives, retrieves or otherwise facilitates acquisition of augmentee and augmentor components 110 and 120. Upon acquisition, the receiver component provides or otherwise makes the augmentee and augmentor available to application component 130 for processing. The receiver component 125 can thus correspond to an application programming interface (API) that facilitates acquisition of an augmentee component 110 and augmentor component 120, among other things.

The application component 130 is a mechanism for applying the augmentor component 120 to the augmentee component 110. In other words, changes specified by the augmentor component 120 can applied to data of the augmentee component 110. Application component 130 can be destructive or non-destructive in nature. Accordingly, results output by the application component 130 can vary. In one instance, the results can correspond to changes applied directly to augmentee data thereby destroying its original state. Alternatively, the results can correspond to a new data construct where changes are made to a copy of augmentee data thereby preserving the original augmentee data. Further, a hybrid can exist between completely destructive and non-destructive. Conceptually, changes can be made to original data such that "B" is produced via application of changes upon "A." Data or a collection thereof can thus be represented or interpreted as an amalgamation of the augmentee and zero or more augmentors.

In accordance with one aspect, the augmentee component 110 need not anticipate augmentation. No provisions for augmentation need be made, unlike for partial classes or aspect-oriented programming, for example. The augmentor component 120 can augment any augmentee component 110. In this manner, programmatic code can be augmented even if portions thereof are not designated for modification. Furthermore, an augmentor component 120 can augment another augmentor component 120.

Figure 2:
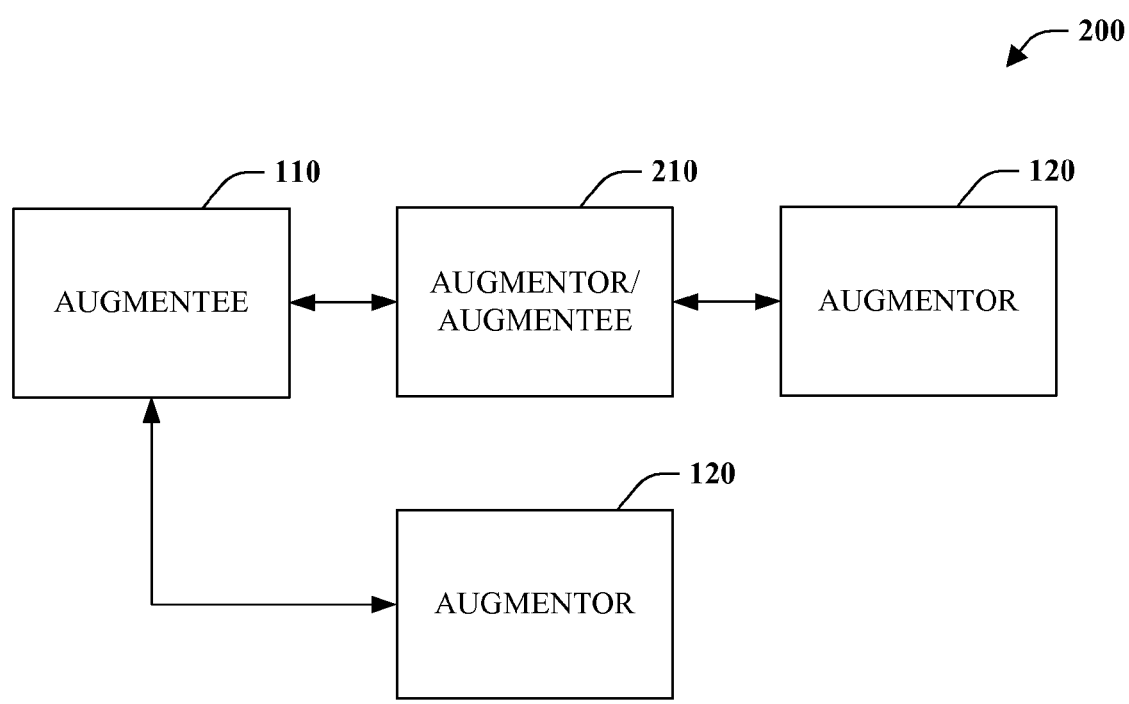
FIG. 2 is a block diagram of a representative compositional data collection.

Turning attention to FIG. 2, a data collection 200 is provided in accordance with an aspect of this disclosure. The data collection 200 includes an augmentee component 110 and a plurality of augmentor components 120. As illustrated, the augmentee component 110 can be associated with a chain of one or more augmentor components 120. Each linked augmentor component 120 can augment the augmentee component 110 and/or another augmentor component 120. Multiple chains can also exist. In one case, all changes can be effectuated. Alternatively, chains can specify alternative augmentations to be applied as a function of some context, for instance.

The augmentee and all relevant augmentors can be interpreted as a single unit. Conceptually, this amounts to physically applying a chain of updates to an original data collection. However, this need not be the actual implementation strategy. As a result, data collections such as documents and computer programs can be composed of and/or defined by an original data collection and a plurality of augmentations. In fact, data collections can be built in this manner. By way of example, an augmentee component 110 can be an empty data collection. Subsets of data can be subsequently added to the augmentee component 110 via one or more augmentor components 120.

In one implementation, the compositional nature of a data structure can be obtained by utilizing the same packaging mechanism for both the augmentee and augmentor. In a programmatic code environment, the packaging mechanism can correspond to an assembly, for example. There are infrastructures for finding assemblies and loading assemblies, among other things. Each assembly component has the same form or shape thereby enabling compositionality. Internal and/or external linking mechanisms can be employed to connect one or more augmentor components 120 to one or more augmentee components 110.

Figure 3:
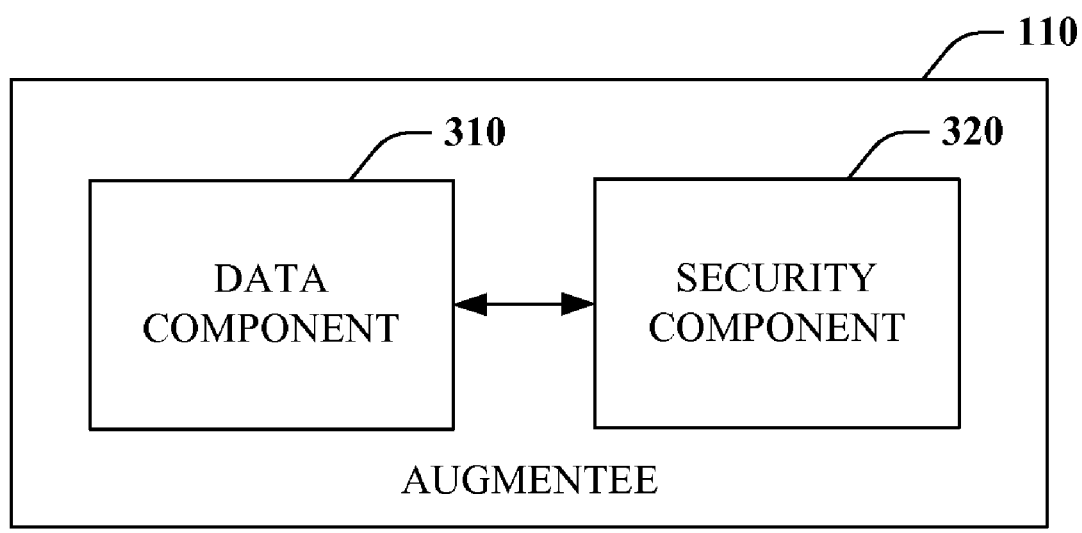
FIG. 3 is a block diagram of a representative augmentee component.

FIG. 3 depicts a representative augmentee component 110. The augmentee component 110 can include a data component 310 housing data of various forms or formats such as documents and programmatic code, among other things. As previously described, the augmentee component 110 need not anticipate augmentation. Rather, it can be augmented by any augmentor. This means that the augmentee is powerless to prevent change. In some instances, this may pose an unacceptable security risk. Accordingly, the augmentee component 110 can also include a security component 320 to prevent undesirable action. For example, the security component 320 can prevent augmentation of particular portions of data. It should be appreciated that the security component 320 can enable or facilitate application of arbitrary security mechanisms including without limitation authentication, authorization, encryption and the like. In this manner, a data originator can have at least some control over if, how and/or by whom all or a portion of data can be modified.

Figure 4:
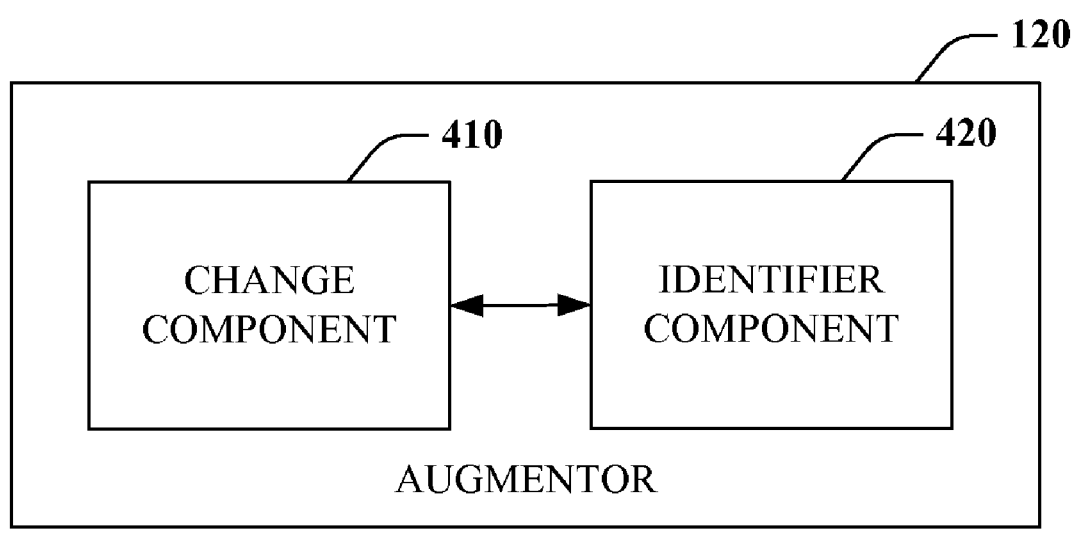
FIG. 4 is a block diagram of a representative augmentor component.

FIG. 4 illustrates a representative augmentor component 120 in accordance with an aspect of this disclosure. The augmentor component 120 includes both a change component 410 and an identifier component 420 to facilitate data augmentation. The change component 410 specifies additions, deletions and/or other modifications to be made to a collection of data. The identifying component 420 is one mechanism to identify a collection of data on which to apply the specified changes. Each augmentor component 120 can thus specify one or more data collections or the like that it augments. In programmatic code, the identifier can take the form of a custom attribute, for instance. In a document, the identifier can be housed as metadata associated with the document, for example.

Figure 5:
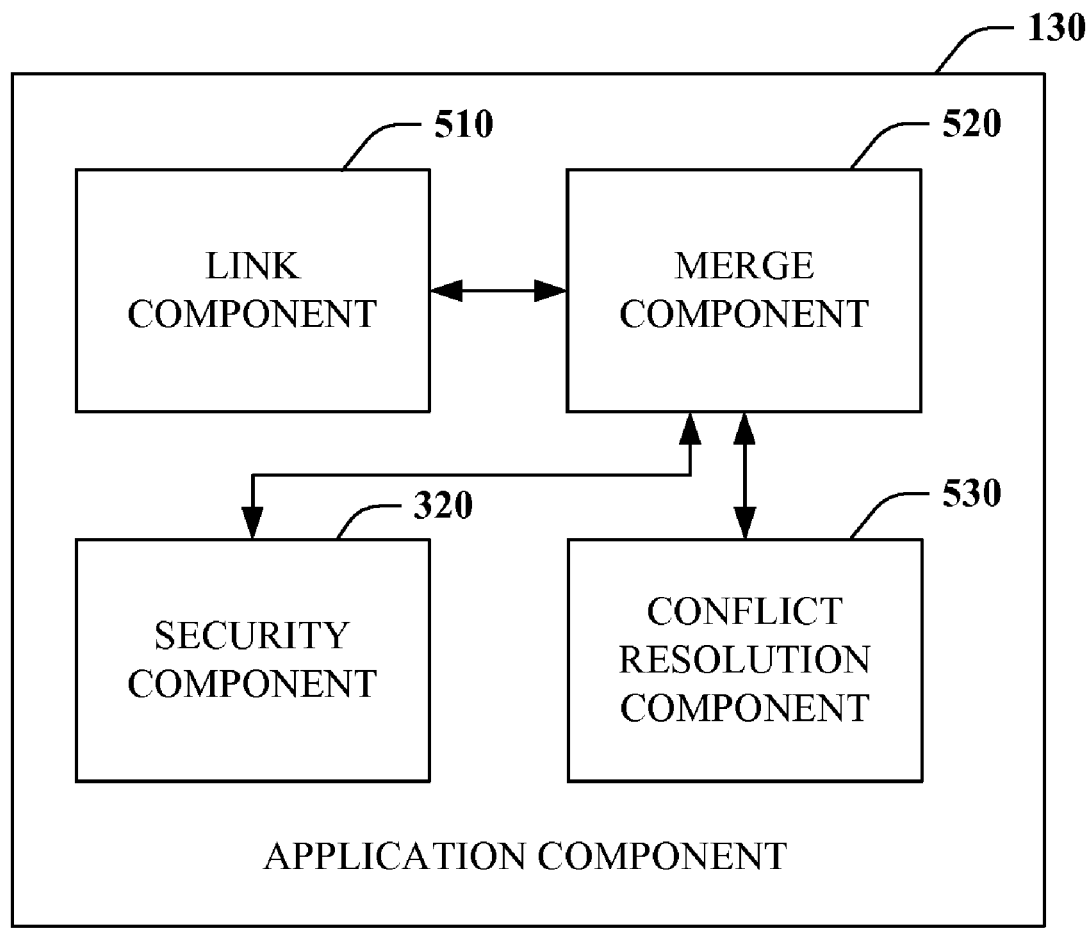
FIG. 5 is a block diagram of a representative application component.

Referring to FIG. 5, a representative application component 130 is depicted. The application component 130 is a mechanism that facilitates augmentation and/or merger of data with one or more associated augmentations. The result produced by the application component 130 is augmented data. This can be either an actual modification of an augmentee or a new construct equivalent to application of changes to the augmentee.

Link component 510 identifies one or more augmentors associated with a given augmentee. The link component 510 can perform such functionality by analyzing identifiers provided in each augmentor. Additionally or alternatively, the link component 510 can consult an external source that houses linking information such as a database or XML (eXtensible Markup Language) document. Information pertaining to an augmentee and zero or more augmentors can be provided or otherwise made available to the merge component 520.

The merge component 520 merges any identified augmentations with associated data thereby producing a different data collection. The merge component 520 can first consult an augmentee and fall back to the original augmentee in the case where there is no associated augmentor or the augmentor does not provide any changes or modifications. If an augmentee does include an associated augmentor, then the merge component 520 can merge the augmentee and associated augmentor. In other words, any changes specified in the augmentor can be applied to the augmentee. Where a chain of augmentors is associated with a single augmentee, a number of processing approaches can be employed. In one case, each augmentor can be applied separately to the augmentee. Alternatively, at least a portion of associated augmentors can first be combined and subsequently applied to the augmentee. Eager or lazy processing can also be employed. More specifically, augmentations can be applied or merged as they are acquired or at a later point, respectively.

The merge component 520 can interact with communicatively coupled conflict resolution component 530. In some instances, augmentations can conflict. For example, a first augmentor can specify that original data should be changed from "A" to "B" while a second augmentor can specify that original data should be changed from "A" to "b." Conflict resolution component 530 can resolve conflicts amongst augmentations. Conflicts can be resolved in accordance with one or more policies, for example first in time or last in time wins. Additionally or alternatively, the conflict resolution component 530 can otherwise determine or infer proper resolution based on context.

The application component 130 can also include security component 320. As previously described, the security component 320 can provide a mechanism for preventing augmentation of at least a portion of data. The merge component 520 can interact with the security component 320 to determine if and/or how augmentations should be applied. If a particular data segment is designated as protected or not subject to augmentation, then any augmentations directed to that segment will not be applied or merged by merge component 520. Similarly, if only the segment designates modification by particular individuals or groups thereof, then prior to merging modifications to such segment the merge component can seek authorization from the security component 320. The security component 320 can provide the necessary functionality to authenticate individuals seeking to augment data including authors of augmentations and those seeking to apply augmentations, among others.

Aspects of the claimed subject matter can be utilized in combination with any form of data. One particular form of data includes programmatic code (e.g., source, compiled, machine . . . ). The following details exemplary embodiments related of the aforementioned subject matter with respect to programmatic code. However, the innovation is not limited thereto.

As previously described in brief, all or a portion of programmatic code can be augmented out-of band. For example, assembles, components and/or classes can be modified in this manner. Moreover, in accordance with one aspect of the disclosure such programmatic code and/constructs can be modified without modification or access to the code being augmented. This is particularly useful when the entity seeking to augment code does not have access the original source code or is unable to modify the original. Augmentations can simply be specified externally and subsequently merged with the original. By way of example, a compiler can translate code generated with language "A" to language "B" without having the source (in language "A") of the original code. Accordingly, augmentations can be injected as if the source was indeed accessible.

Similarly, programmatic code can be augmented by one or more augmentations. Accordingly, code can be re-defined as the sum of the original and all associated augmentations. It should further be appreciated that alternate augmentations can exist such that at least one is applied based on context. For example, if a program were to execute in a first environment then augmentation "A" would apply, whereas if the program were to execute in second environment then augmentation "B" would be applied.

Aspects of data augmentation can be utilized with respect to code replacement, for example replacing native code with intermediate language (IL) code and/or replacing IL code with native code. By way of example, consider a scenario where IL code is to be compiled to JavaScript. In certain cases, such translation may be undesirable and/or impossible. For instance, it might not be possible utilize existing IL code to generate JavaScript when the IL code is using unsafe code, P/Invoke or COM interop. While in certain cases it is possible to access this functionality directly in JavaScript via ActiveX or like controls, this approach is inherently platform dependent. Additionally or alternatively, one may desire a different implementation of the original IL code when JavaScript natively provides required functionality (e.g., Array, Date, Math, String . . . ). Here, it is desirable to call directly into such libraries and/or constructs. However, the source code for the original construct may not be available. Moreover, it might not be a good idea to modify source code, especially if there may be alternate implementations for single members for instance to cater to different browsers. Further yet, one might want to provide a completely new implementation purely in IL. In these scenarios, separate, non-obtrusive augmentors can be employed to replace pure IL code with native code or vice versa.

Augmentors can also be employed to replace native code with native code for instance for servicing, personalization, specialization and/or extension. In essence, one implementation is changed into another implementation in furtherance of one or more purposes. As per servicing, an augmentor can be sent providing changes to patch security vulnerabilities and/or bugs, among other things. A generic program can also be personalized for particular users. This allows individual users to effect changes to facilitate interaction and/or use of a program with one or more augmentors. Specialization concerns application and/or hardware issues. For example, a program or component thereof that can run on any machine can be specialized for a particular machine. In this way, augmentations can be employed to leverage special machine and/or software abilities, inter alia. Programmatic code can also simply be extended to add additional functionality. One particularly useful application concerns versioning. Rather than maintaining multiple versions of full programs, developers need only provide augmentors. A program will consist of one version and the sum of applicable augmentors.

The subject augmentation mechanisms can also be utilized as an alternative for inheritance, partial classes and/or aspect-oriented programming. Inheritance is often utilized for specialization and extension, but introduces a new type and requires a lot of upfront design. While augmentation can be utilized with respect to introducing a new type, this can also be accomplished by simply extending an existing type with an augmentor. Partial classes are extension mechanisms that anticipate augmentation. In particular, partial classes require classes to be labeled as partial to enable future enhancement. Here, augmentors supersede these mechanisms since program augmentation can occur regardless of whether they have been previously designated for optional extension. Further yet, the subject mechanisms can be utilized as an alternative to aspect-oriented programming that, among other things, utilizes a different programmatic structure to effect change (e.g., AspectJ to alter Java).

Aspects of the subject augmentation system can also be employed with respect to object/relational (O/R) mapping. Given a set of classes, the problem concerns affording a mapping to database tables. There are several ways in which this is conventionally accomplished including custom attributes on classes and using external XML (eXtensible Markup Language) files to describe the mapping. Both are problematic. If custom attributes are added to a class, there can be only one mapping. The same type cannot be mapped to different databases. XML files are non-compositional. If a mapping changes for example if a database changes, the whole mapping needs to be redone. Here, an augmentor file can be utilized to describe a change. Further, more than one custom attribute can be associated with a class as augmentors can easily specify alternate attributes, for example based on a particular database.

The aforementioned augmentation mechanisms can take advantage of target language features to facilitate efficient implementation. By way of example and not limitation, compilation of IL to JavaScript or other JavaScript augmentation scenario utilize redefinition functionality in the language to effect augmentation. In JavaScript, arbitrary functions can be redefined in a destructive manner. The last definition "wins" or takes priority over prior definitions. Consider the following code snippet:

```
function f( ){W.Script.Echo("Hello");}
function f( ){W.Script.Echo("World");} //Augmentation
f( );
```

Here, function f( ) has been defined twice—once to print "Hello" and once to print "World." In JavaScript, the second definition overrides the first. As a result, the above code prints "World."

JavaScript's redefinition functionality can be leveraged to facilitate augmentation as described supra. In particular, if a function is to be modified, a new function can be injected subsequent to the original and/or a previously entered function. In the above example, the function that prints "World" can correspond to an augmentation of the original functionality that prints "Hello." JavaScript supports destructive substitution. Accordingly, changes can be applied directly by overriding prior data, for instance by defining something twice. However, non-destructive behavior can also be accomplished by saving the old data prior to application of an augmentation. For example, if "A" is the original data and later it is desired to change "A" to something else, then the old value of "A" is first saved in some auxiliary variable like "a" where the new "A" or newly named "B" can access "a."

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the conflict resolution component 530 can employ such mechanisms to determine or infer resolutions. Similarly, the security component 320 can utilize these mechanisms protect data from augmentation by inferring and thwarting attempts to augment protected data, for instance.

Figure 6:
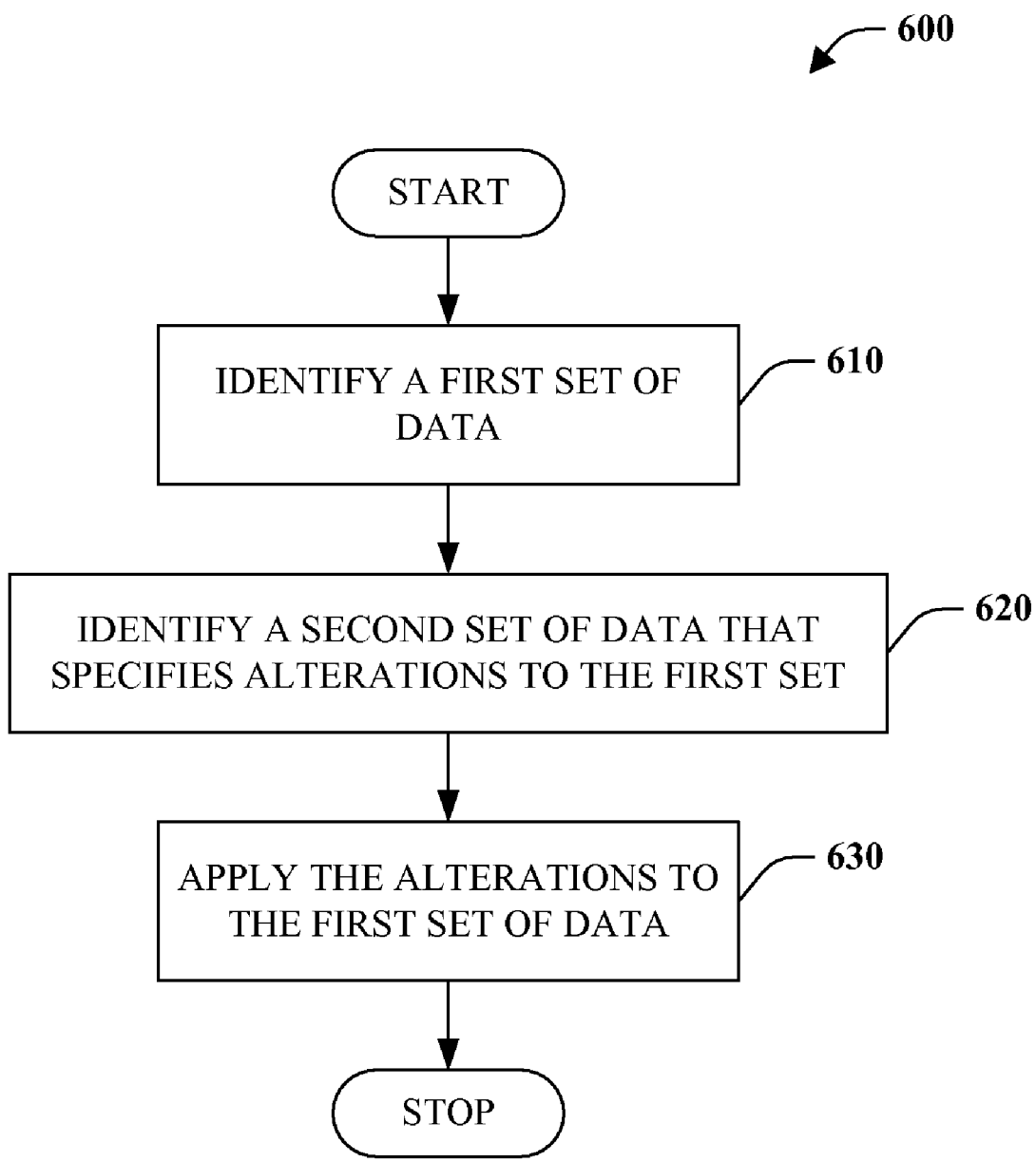
FIG. 6 is a flow chart diagram of a method of augmenting data.
Figure 7:
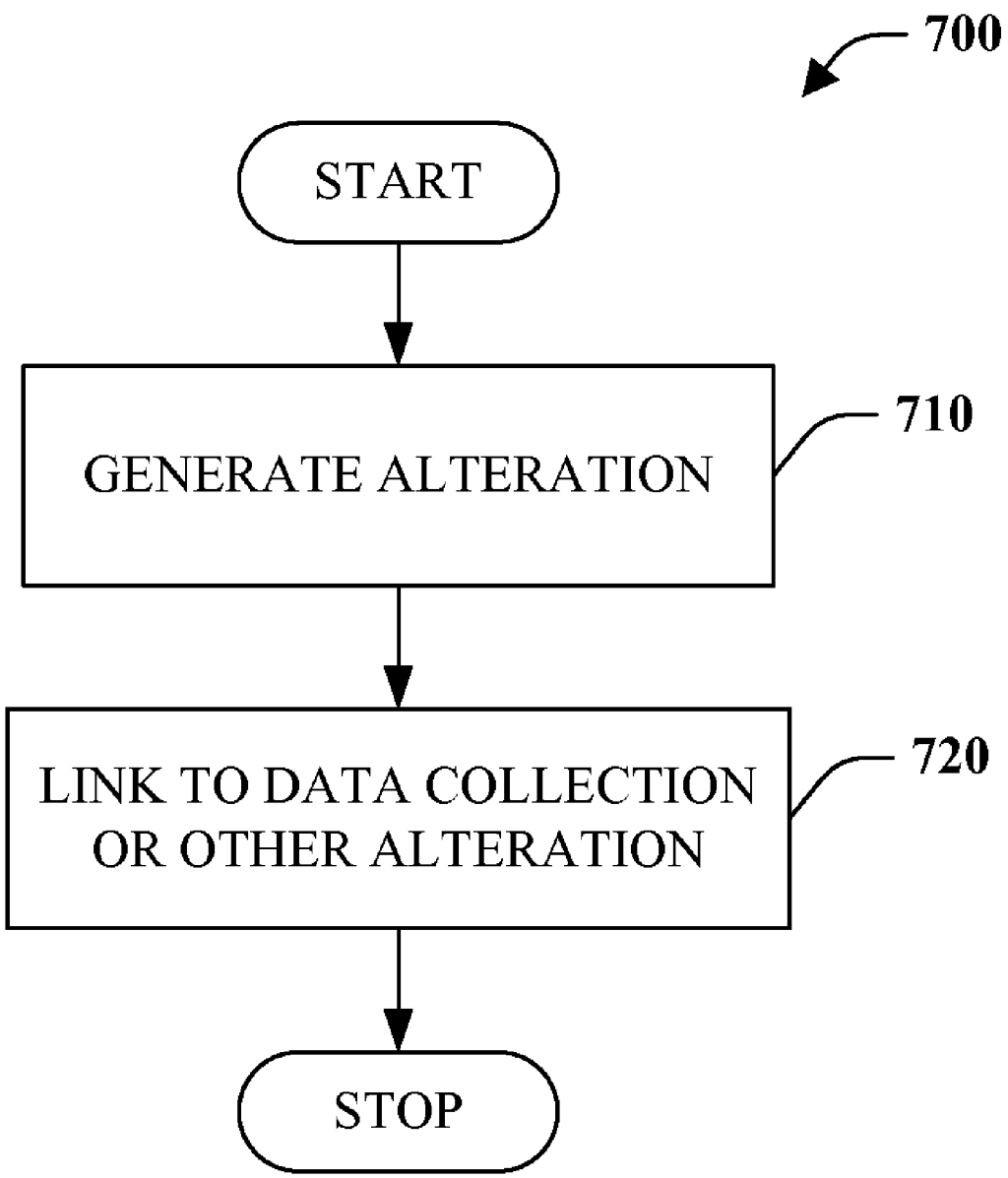
FIG. 7 is a flow chart diagram of a method of specifying changes.
Figure 8:
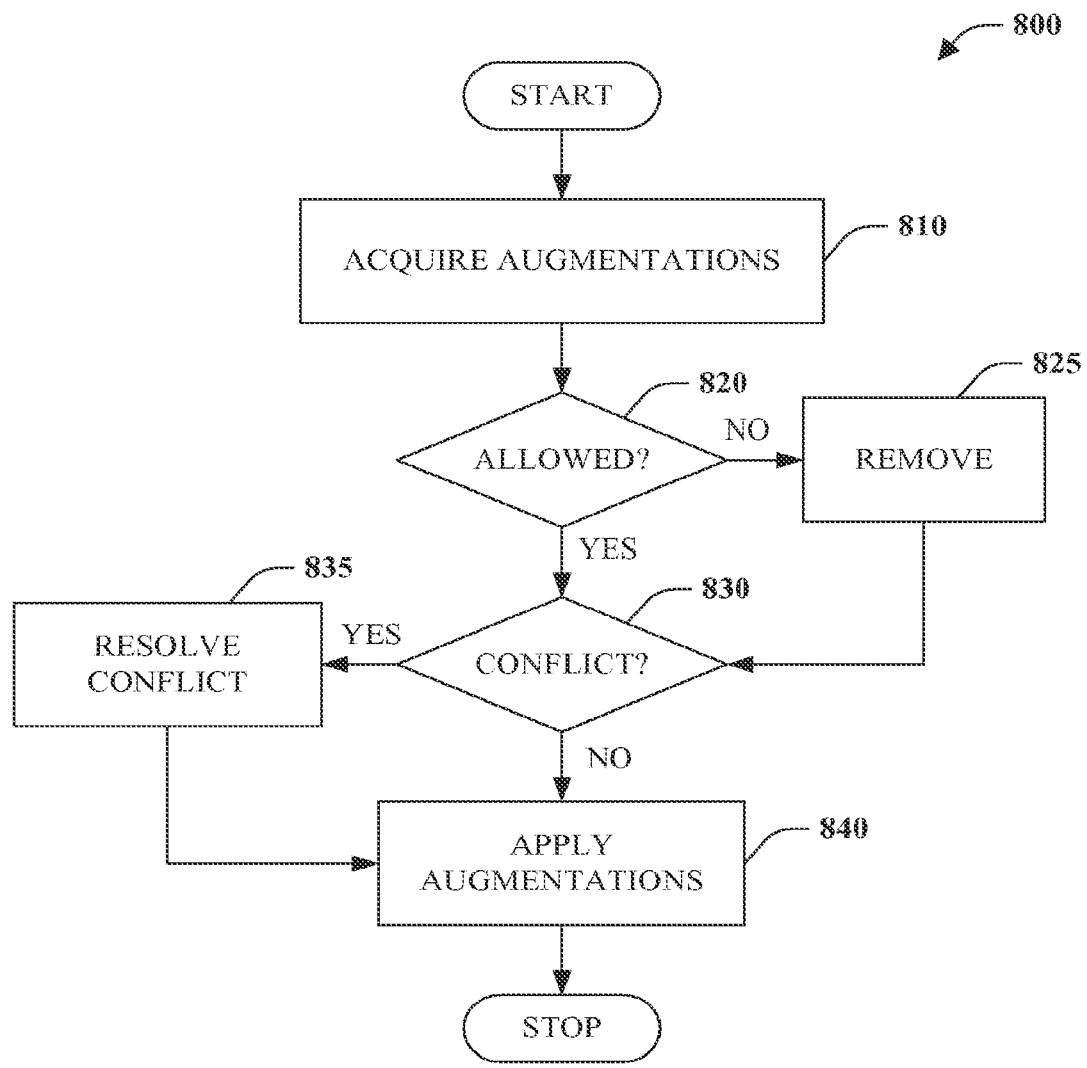
FIG. 8 is a flow chart diagram of a method of interacting with a plurality of augmentations.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 6, a data augmentation method 600 is depicted in accordance with an aspect of the claimed subject matter. Data can correspond to any form of data including more specifically programmatic code (e.g., source, assembly, machine . . . ). At reference numeral 610, a first set of data is identified. This first set of data can include original data and/or a previous augmentation. At reference 620, a second set of data is identified that specifies alterations to the first set. This second set of data can be identified as a function of first set identifying indicia within the second set of data, second set identifying indicia within the first set of data, and/or from an external source. For example, the indicia can be a custom attribute with the second set of data or housed in an external XML file that links the first and second data sets. At reference numeral 630, the alterations of the second data set are applied to the first data set. Conceptually first set "A" is converted to "B" via merger or application of one or more augmentations. Additional augmentation can subsequently change "B" to "C." It is to be appreciated that the first data set need not actually be physically changed, as it may not be accessible for modification. Rather, a data set is interpreted as a sum of the original and all associated augmentations.

FIG. 7 is a flow chart diagram of a method 700 of specifying changes in accordance with an aspect of the claimed subject matter. At reference numeral 710, an alteration is generated. An alteration corresponds to anything that removes, extends or otherwise modifies or changes other data. The alteration need only specify changes to be made. A complete copy of data including modifications is not necessary. For instance, to add a logging function to a method the alteration includes solely the logging function and perhaps some reference information. At numeral 720, the alteration is linked to an original data collection or other alteration. The alteration construct can include the link or alternatively the link can be stored externally in a database or XML file, for example.

FIG. 8 illustrates a method 800 of interacting with a plurality of augmentations. An original data collection or file can be associated with more than one augmentation. One or more chains of one or more augmentations can be linked to a file. Augmentation constructs or augmentors can be compositional and/or recursive in nature.

At reference numeral 810, a plurality of augmentations or augmentation embodying constructs are acquired. These constructs can be packaged together or otherwise linked to a related file or collection of data. For instance, the augmentations can be part of a project or assembly.

At numeral 820, a determination is made as to whether the augmentations are all allowed. In accordance with one embodiment, security mechanisms can be employed to prevent augmentation of all or a portion of an original file. For example, a particular function or class can be designated un-modifiable. If all augmentations are allowable, the method continues at 830. If not, unallowable augmentations are removed at 825. This can correspond to removal of an entire augmentation construct, for example if provided by an unauthorized entity, or a portion of an augmentation construct. Once removed, the method can proceed to numeral 830.

At reference numeral 830, a determination is made as to whether there are any conflicting augmentations amongst the allowable augmentations. Since there can a number of augmentations generated by any number of entities, such a check needs to be made to capture only proper augmentations. For instance, one individual may specify an augmentation that conflicts with another individual's augmentation. In some instances, this may be the intention, in others it may not. If it is determined that there are conflicting augmentation or there is a likelihood that there is a conflict (e.g., greater than a threshold), the method proceeds to 835. At 835, any identified conflicts are resolved. Resolution can correspond to a particular conflict resolution policy or other determined or inferred resolution.

At numeral 840, augmentations can be applied with respect to a linked data collection or file. The result is an amalgamation of the original data collection and a plurality of augmentations. The amalgamation can be produced by applying each augmentation to the original data and/or by merging at least a portion of the augmentations and subsequently applying the aggregate set of augmentations to the original. Further, application can be performed either eagerly or lazily.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
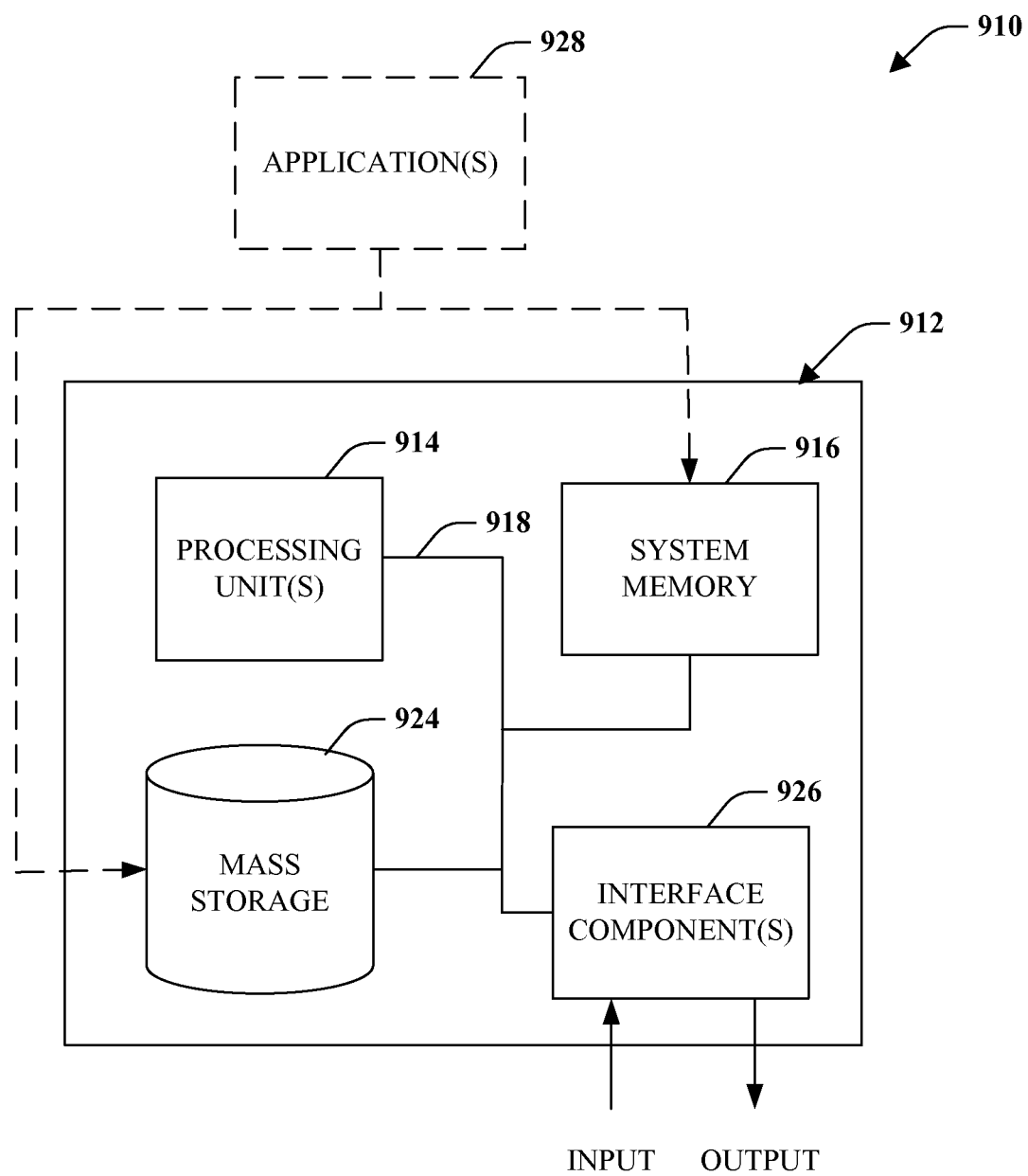
FIG. 9 is a schematic block diagram illustrating a suitable operating environment for aspects of the subject disclosure.
Figure 10:
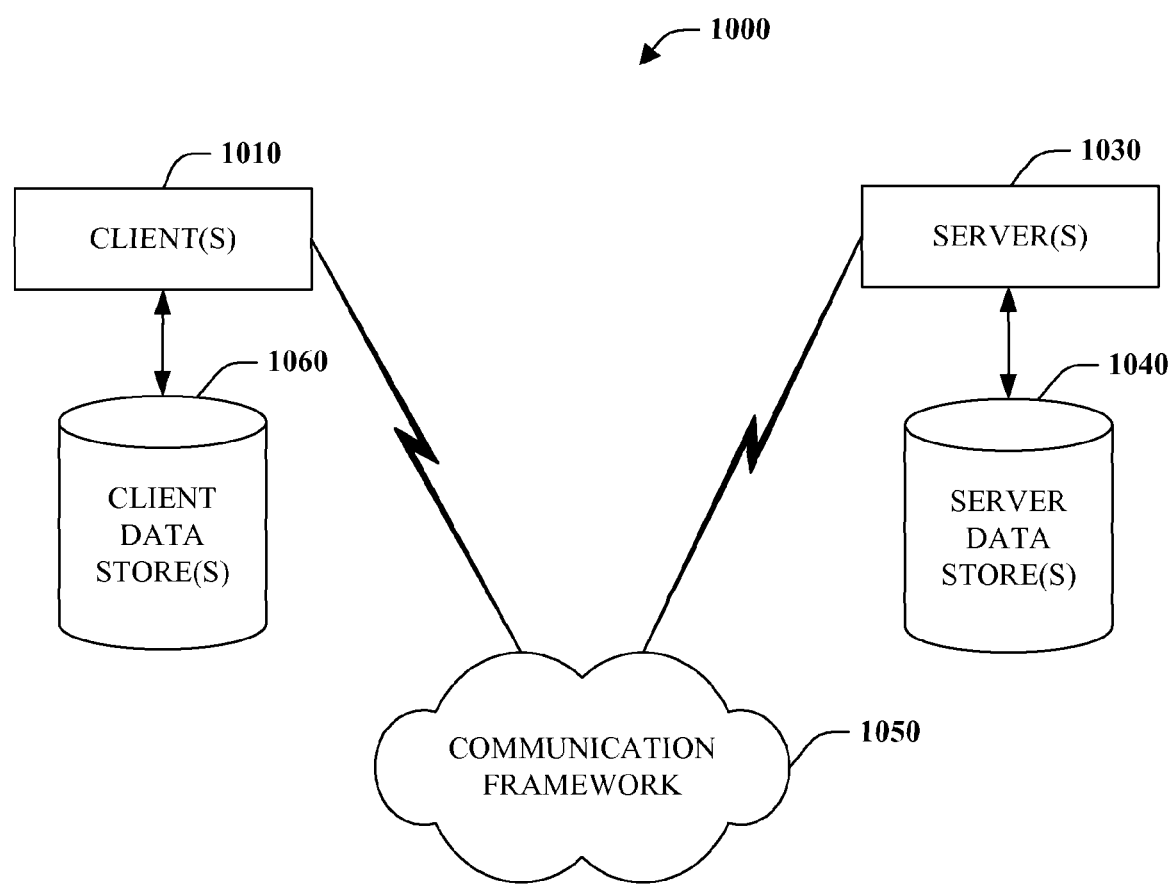
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 910 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 910. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030. For example, programmers on client(s) 1010 can access augmentations or links thereto housed by server(s). Furthermore, augmentations can be transmitted between client(s) 1010 utilizing the communication framework 1050.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A method, implemented within a computer system that includes at least one processor, for applying at least one out-of-band augmentation to a collection of data, the method comprising:
  a receiver component at a computer system acquiring an original collection of data that comprises programmatic code of a first programming language that makes no provisions for augmentation, the computer system including at least one processor;
  the receiver component acquiring at least one separate out-of-band augmentation to the original collection of data that specifies alterations to the original collection of data separate or external from the original collection of data, the at least one out-of-band augmentation comprising:
    at least one addition, deletion or change to the original collection of data, including at least one addition, deletion or change that redefines at least one function of the programmatic code; and
    at least one identifier that identifies at least the original collection of data as being subject to the at least one addition, deletion or change;
  an application component at the computer system identifying the original collection of data as being subject to the at least one out-of-band augmentation based on determining that the at least one identifier identifies the original collection of data; and
  the application component merging the at least one out-of-band augmentation with the original collection of data by applying the at least one addition, deletion or change to the original collection of data to generate an augmented original collection of data that includes the at least one addition, deletion or change, including the redefinition of the at least one function, wherein merging translates the programmatic code to a second programming language.

2. The method of claim 1, further comprising a security component that includes security information that regulates augmentation of at least one portion of the original collection of data.

3. The method of claim 2, wherein the security information regulates augmentation of at least one portion of the original collection of data based on an identity of a user authoring or performing the augmentation.

4. The method of claim 1, wherein merging is destructive, such that the augmented original collection of data replaces the original collection of data.

5. The method of claim 1, wherein merging is non-destructive, such that the augmented collection of data is a new construct equivalent to the original collection of data and any merged augmentation(s).

6. The method of claim 1, wherein the programmatic code comprises programmatic code generated from source code, and wherein merging the at least one out-of-band augmentation is performed without reference to the source code.

7. The method of claim 1, wherein the programmatic code comprises intermediate language code or JavaScript code.

8. The method of claim 1, wherein merging is performed by a compiler or an interpreter.

9. The method of claim 1, wherein at least one out-of-band augmentation replaces native code with intermediate language code, intermediate language code with native code or native code with native code.

10. The method of claim 1, wherein the at least one identifier comprises a custom attribute.

11. The method of claim 1, wherein redefining at least one function of the programmatic code comprises replacing the at least one function with a different function.

12. The method of claim 1, wherein the at least one out-of-band augmentation applies to at least a second original collection of data, and wherein the at least one out-of-band augmentation comprises at least one identifier that identifies the second original collection of data as being subject to the at least one addition, deletion or change.

13. The method of claim 1, wherein merging comprises merging a plurality of out-of-band augmentations to the original collection of data individually.

14. The method of claim 1, wherein merging comprises merging a plurality of out-of-band augmentations with each other to create a cumulative augmentation, and then merging the cumulative augmentation with the original collection of data.

15. The method of claim 1, wherein merging comprises merging a plurality of out-of-band augmentations, the method further comprising:
   detecting a conflict between at least two out-of-band augmentations; and
   resolving the conflict in accordance with one or more policies.

16. The method of claim 1, wherein the original collection of data and the at least one separate out-of-band augmentation utilize the same packaging mechanism.

17. A computer system comprising:
   at least one processor; and
   one or more computer storage devices having stored thereon computer executable instructions that, when executed by the at least one processor, implement a method, comprising:
      a receiver component at the computer system acquiring an original collection of data that comprises programmatic code of a first programming language that makes no provisions for augmentation;
      the receiver component acquiring at least one separate out-of-band augmentation to the original collection of data that specifies alterations to the original collection of data separate or external from the original collection of data, the at least one out-of-band augmentation comprising:
         at least one addition, deletion or change to the original collection of data, including at least one addition, deletion or change that redefines at least one function of the programmatic code; and
         at least one identifier that identifies at least the original collection of data as being subject to the at least one addition, deletion or change;
      an application component at the computer system identifying the original collection of data as being subject to the at least one out-of-band augmentation based on determining that the at least one identifier identifies the original collection of data; and
      the application component merging the at least one out-of-band augmentation with the original collection of data by applying the at least one addition, deletion or change to the original collection of data to generate an augmented original collection of data that includes the at least one addition, deletion or change, including the redefinition of the at least one function, wherein merging translates the programmatic code to a second programming language.

18. One or more computer storage devices having stored thereon computer executable instructions that, when executed by at least one processor of a computer system, implement a method for applying at least one out-of-band augmentation to a collection of data, the method comprising:
   a receiver component at a computer system acquiring an original collection of data that comprises programmatic code of a first programming language that makes no provisions for augmentation, the computer system including at least one processor;
   the receiver component acquiring at least one separate out-of-band augmentation to the original collection of data that specifies alterations to the original collection of data separate or external from the original collection of data, the at least one out-of-band augmentation comprising:
      at least one addition, deletion or change to the original collection of data, including at least one addition, deletion or change that redefines at least one function of the programmatic code; and
      at least one identifier that identifies at least the original collection of data as being subject to the at least one addition, deletion or change;
   an application component at the computer system identifying the original collection of data as being subject to the at least one out-of-band augmentation based on determining that the at least one identifier identifies the original collection of data; and
   the application component merging the at least one out-of-band augmentation with the original collection of data by applying the at least one addition, deletion or change to the original collection of data to generate an augmented original collection of data that includes the at least one addition, deletion or change, including the redefinition of the at least one function, wherein merging translates the programmatic code to a second programming language.

* * * * *